(12) United States Patent
Albrecht

(10) Patent No.: US 9,733,105 B2
(45) Date of Patent: Aug. 15, 2017

(54) MAGNETIC FIELD MEASURING DEVICE

(71) Applicant: Micronas GmbH, Freiburg (DE)

(72) Inventor: Stefan Albrecht, Gundelfingen (DE)

(73) Assignee: TDK-Micronas GmbH, Freiburg (DE)

( * ) Notice: Subject to any disclaimer, the term of this patent is extended or adjusted under 35 U.S.C. 154(b) by 177 days.

(21) Appl. No.: 14/735,444

(22) Filed: Jun. 10, 2015

(65) Prior Publication Data

US 2015/0354984 A1  Dec. 10, 2015

(30) Foreign Application Priority Data

Jun. 10, 2014 (DE) .......................... 10 2014 008 173

(51) Int. Cl.
*G01D 5/14* (2006.01)
*G01D 5/245* (2006.01)

(52) U.S. Cl.
CPC ............. *G01D 5/142* (2013.01); *G01D 5/145* (2013.01); *G01D 5/2451* (2013.01)

(58) Field of Classification Search
CPC ....... G01D 5/142; G01D 5/145; G01D 5/2451
See application file for complete search history.

(56) References Cited

U.S. PATENT DOCUMENTS

| 6,917,193 | B1 | 7/2005 | Howard et al. | |
|---|---|---|---|---|
| 8,203,329 | B2 | 6/2012 | Hohe et al. | |
| 8,736,258 | B2 | 5/2014 | Trontelj | |
| 8,878,524 | B2 | 11/2014 | Heberle | |
| 8,963,539 | B2 | 2/2015 | Kitade et al. | |
| 2002/0021124 | A1* | 2/2002 | Schott | G01D 5/145 324/207.2 |
| 2007/0229060 | A1 | 10/2007 | Taguchi et al. | |
| 2009/0326860 | A1* | 12/2009 | Hainz | G01D 5/24452 702/163 |
| 2010/0060267 | A1* | 3/2010 | Wagner | G01D 5/145 324/207.2 |
| 2011/0046906 | A1 | 2/2011 | Albertini | |

(Continued)

FOREIGN PATENT DOCUMENTS

| DE | 199 46 935 A1 | 5/2001 |
|---|---|---|
| DE | 10 2007 041 230 B3 | 4/2009 |

(Continued)

*Primary Examiner* — Giovanni Astacio-Oquendo
*Assistant Examiner* — Zannatul Ferdous
(74) *Attorney, Agent, or Firm* — Muncy, Geissler, Olds & Lowe, P.C.

(57) ABSTRACT

A magnetic field measuring device having a semiconductor body with a surface parallel to an x-y plane and having a magnet with a flat main extension surface parallel to the x-y plane, the direction of magnetization changes along the main extension surface due to at least two adjacent magnetic poles, the magnet being rotatable relative to the IC package about an axis of rotation extending in a z direction and the z direction being orthogonal to the x-y plane. An imaginary extension of the axis of rotation passes through the magnet. The semiconductor body has three magnetic field sensors spaced apart from one another on the surface, and each of the magnetic field sensors measures the same component of the magnetic field. All magnetic field sensors are located along the imaginary extension of the axis of rotation within the projection of the main extension surface.

18 Claims, 2 Drawing Sheets

(56) References Cited

U.S. PATENT DOCUMENTS

| | | | |
|---|---|---|---|
| 2012/0176126 A1* | 7/2012 | Naganuma | G01R 33/0011 324/207.25 |
| 2013/0265041 A1 | 10/2013 | Friedrich et al. | |
| 2016/0258781 A1* | 9/2016 | Ausserlechner | G01D 3/08 |

FOREIGN PATENT DOCUMENTS

| | | |
|---|---|---|
| EP | 1 182 461 A2 | 2/2002 |
| EP | 0 916 074 B1 | 7/2003 |
| EP | 2 584 304 A1 | 4/2013 |

\* cited by examiner

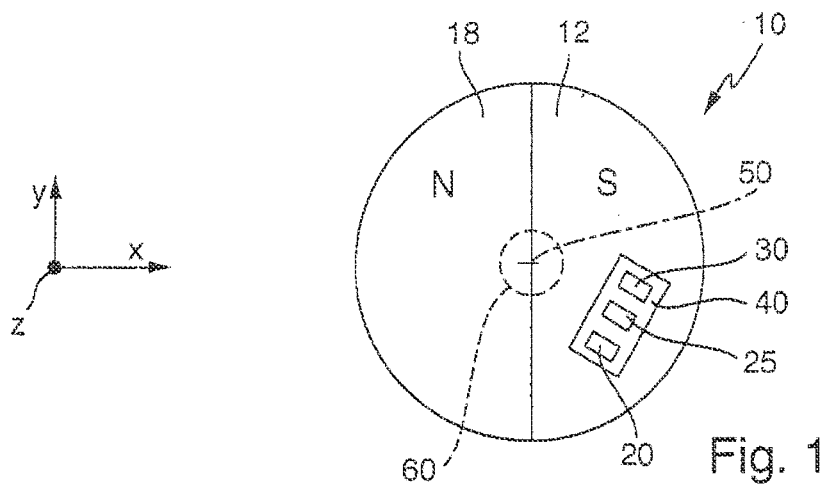
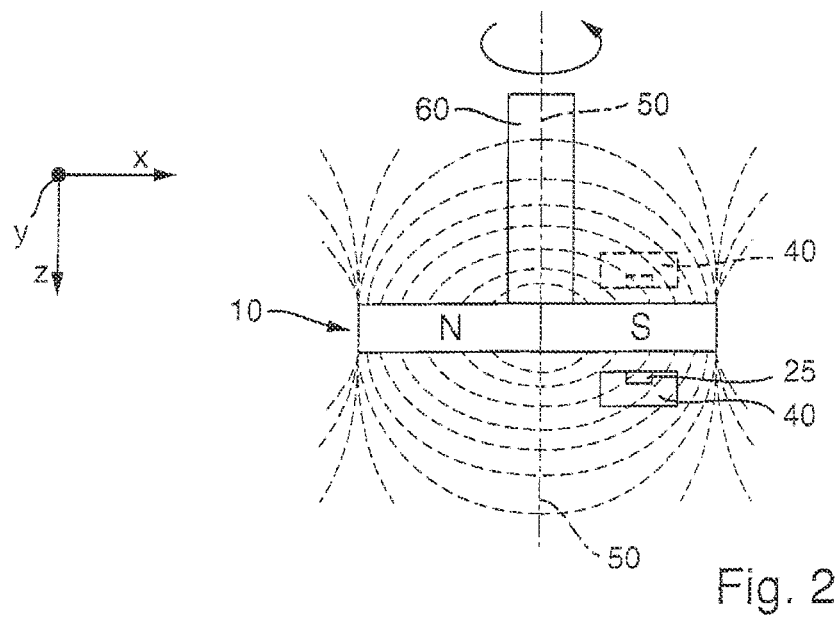

MAGNETIC FIELD MEASURING DEVICE

This nonprovisional application claims priority under 35 U.S.C. §119(a) to German Patent Application No. 10 2014 008 173.7, which was filed in Germany on Jun. 10, 2014, and which is herein incorporated by reference.

BACKGROUND OF THE INVENTION

Field of the Invention

The present invention relates to a magnetic field measuring device.

Description of the Background Art

Different approaches for designing a magnetic field measuring device are known from EP 0 916 074 B1, EP 1 182 461 A2, WO 2009/05237 A1, EP 2 584 304 A1, DE 199 46 935 A1, U.S. Pat. No. 6,917,193 B1, and DE 10 2007 041 230 B3. Furthermore, additional methods and devices for magnetic field sensors, in particular with Hall effect sensors, are known from US 2011/0046906 and US 2007/0229060.

SUMMARY OF THE INVENTION

It is therefore an object of the invention is to provide a device that advances the state of the art, in particular to provide a magnetic field measuring device.

According to an embodiment of the invention, a magnetic field measuring device is provided, having a semiconductor body with a surface parallel to an x-y plane, wherein the x direction and the y direction are orthogonal to one another, and having a magnet with a flat main extension surface parallel to the x-y plane, wherein the direction of magnetization changes along the main extension surface due to at least two adjacent magnetic poles, and wherein the magnet is rotatable relative to the semiconductor body about an axis of rotation extending in a z direction and the z direction is orthogonal to the x-y plane, and wherein an imaginary extension of the axis of rotation passes through the main extension surface of the magnet, preferably at the centroid of the magnet, and wherein the surface of the semiconductor body is spaced apart from the main extension surface of the magnet in the z direction, and the semiconductor body has three magnetic field sensors, preferably monolithically integrated, spaced apart from one another on the surface, and each of the magnetic field sensors measures the same component of the magnetic field, and the first magnetic field sensor and the third magnetic field sensor each have substantially the same spacing from a second magnetic field sensor, and wherein, for a preferably isometric projection of the main extension surface along the imaginary extension of the axis of rotation or along the axis of rotation, all magnetic field sensors are located within the projected area, and all magnetic field sensors have a spacing from the imaginary extension of the axis of rotation or from the axis of rotation, wherein the first magnetic field sensor and the third magnetic field sensor each have substantially the same spacing from the imaginary extension of the axis of rotation.

The phrase "along the imaginary extension of the axis of rotation" can be used hereinafter to describe an arrangement of the magnetic field sensors "below" the magnet. The phrase "along the extension of the axis of rotation" can designate an arrangement of the magnetic field sensors above the magnet. In addition, the term "z direction" can be understood to mean a direction along the positive z direction as well as the opposite direction, which is to say in a minus z direction.

The spacing of the magnetic field sensors from the semiconductor body in the z direction, i.e. from the imaginary extension of the axis of rotation or from the axis of rotation, can be less than 10 cm, preferably less than 5 cm, and extremely preferably less than 1 cm. In addition, the magnet can have at least two poles in the x-y plane. The two magnetic poles, which is to say the north pole and the south pole, can have the same area in the x-y plane. In other words, the magnet can have a so-called diametrical magnetization with regard to the x-y plane.

In an embodiment, the magnet can have, along the main extension surface, four magnetic poles, especially preferably six magnetic poles, and extremely preferably eight magnetic poles. In other words, the magnet has a segmentation having four or more magnetic poles along the main extension surface. The segments can be made equal in size. In an embodiment, the poles of the magnet can be short-circuited along one side of the main extension surface. The short circuit can be implemented, in particular, by means of a ferromagnetic plate. To this end, the plate can be attached such that a magnetic short circuit is formed between the magnetic poles and the plate on one of the surfaces along the main extension surface. A spreading of the magnetic field can be almost completely suppressed on one side by the plate. In an embodiment, the magnetic poles can be implemented as a Halbach array.

An advantage of the device according to the invention is that the magnetic field measuring device has a very compact configuration, which is to say that multiple magnetic field sensors can now be integrated on a single semiconductor body. Another advantage is that an integrated circuit in the surface of the semiconductor body can also be implemented on the semiconductor body, wherein the integrated circuit preferably stands in operative electrical connection with the three magnetic field sensors, and the semiconductor body is integrated into an IC package. Moreover, an analysis algorithm can also be integrated into the IC. As a result, a cost-effective magnetic field measuring device can be produced in order to use differential measurements of the signals of given pairs of magnetic field sensors to suppress interfering DC magnetic fields that specifically are not generated by the magnet of the measuring arrangement, for example. In addition, the curve of the magnetic field strength of the magnet can be determined from two differential measurements. The position of the semiconductor body in relation to the magnet can be determined through a comparison with stored values. Another advantage is that, when the magnet is rotated about the axis of rotation, the angle of rotation $\alpha$ in relation to the semiconductor body can be derived from the curve of the amplitude W, using the formula:

$$W(\alpha) = \tan(\alpha) \times \left[ \frac{(Az/A1) - \cos(\alpha)}{\sin(\alpha)} \right]$$

where the term Az/A1 is a correction term for the deviation of the position of the second magnetic field sensor, and where $W(\alpha)$ is obtained from the differential signals $f_r(\alpha)$ and $f_l(\alpha)$ of the three sensor signals using the formula:

$$W(\alpha) = \frac{f_r(\alpha) - f_l(\alpha)}{f_r(\alpha) + f_l(\alpha)}$$

A sinusoidal or cosinoidal curve can be present, and the determination of the angle of rotation can be carried out reliably and easily.

In an embodiment, the second magnetic field sensor can have a smaller spacing or a greater spacing from the imaginary extension of the axis of rotation than the first magnetic field sensor. The three magnetic field sensors can be arranged along a connecting line, and the second magnetic field sensor can be located between the other two magnetic field sensors, preferably in the center of the connecting line. This makes it possible to considerably reduce the effort for adjusting the semiconductor body or the IC package with respect to the position of the imaginary extension to the axis of rotation and to manufacture a cost-effective magnetic field measuring device for determining the angle of rotation.

In an embodiment, magnetic field sensors can be provided on exactly three locations on the semiconductor body. It is sufficient to produce exactly three magnetic field sensors at exactly three positions. The semiconductor body can have a quadrangular shape in the x-y plane and the three magnetic field sensors can be arranged essentially or exactly along a diagonal in the quadrangle. One advantage is that costly chip area can be saved in this way, and at the same time the spacing between the magnetic field sensors is increased.

The magnetic field sensors can be substantially identically oriented, which is to say that each of the magnetic field sensors measures the same component of the magnetic field of the magnet. In an embodiment, the magnetic field sensors can be implemented as Hall effect sensors, preferably as Hall plates, and extremely preferably as vertical Hall effect sensors.

In another embodiment, the magnet can have a circular and disk-shaped design. In particular, the magnet is implemented as a circle in the x-y plane, wherein the radius of the circle can be greater than the spacing between the first magnetic field sensor and the second magnetic field sensor. In another embodiment, the radius is also greater than the length of the connecting line between the first magnetic field sensor and the third magnetic field sensor.

The magnetic field measuring device can be used in particular for detection of the angle of rotation of the magnet that is rigidly attached to the axis or to a shaft. One advantage is that, due to the spacing of the magnetic field sensors from the magnet, it is possible to determine the angle of rotation of a stationary axis, or in particular of the shaft, as well as the angle of rotation of a rotating axis if the magnet is rigidly coupled to the axis or shaft. In other words, the magnetic field measuring device can be used to detect the angle of rotation of the shaft. To this end, the signals from the magnetic field sensors are processed using a differential analysis method, i.e. the angle of rotation of the axis, or in particular of the shaft, can be determined from the signal differences between the first magnetic field sensor and the second magnetic field sensor, and between the second magnetic field sensor and the third magnetic field sensor. In particular in the case of a start/stop function of a motor vehicle, this makes it possible to determine the position of the crankshaft or the position of the camshaft, even for a stationary engine. Starting of the engine can be facilitated in this way.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a top view of an embodiment according to an embodiment of invention of a magnetic field measuring device;

FIG. 2 shows a cross-section of the embodiment from FIG. 1 along an axis of rotation in a z direction;

DETAILED DESCRIPTION

Figure 3:
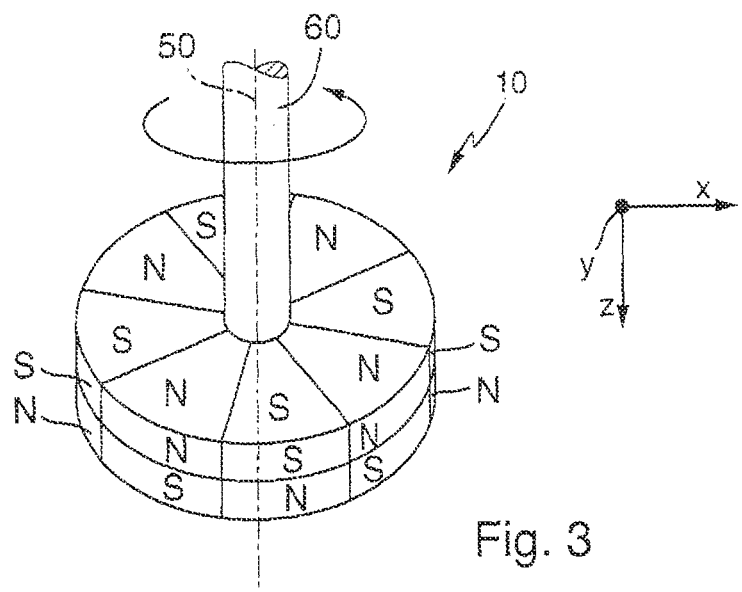
FIG. 3 shows an embodiment with a magnet having a total of sixteen magnetic poles.

The illustration in FIG. 1 shows a top view of a magnet 10 with two magnetic poles 12 and 18, wherein the individual circular segments of the magnetic poles are made equal in size. One of the two magnetic poles 12 and 19 is a north pole and one is a south pole. Furthermore, a first magnetic field sensor 20 in the x-y plane and a second magnetic field sensor 25 in the x-y plane and a third magnetic field sensor 30 in the x-y plane are implemented in the surface of a semiconductor body 40. The semiconductor body 40 is arranged below the magnet, wherein "below" can be understood to mean a spacing of the magnet along a z direction or in the direction of an imaginary extension of an axis of rotation 50. The magnetic field sensors 20, 25, and 30 are each spaced apart from one another and are implemented as Hall effect sensors, and each have a main extension surface extending in a z direction, wherein only a view of a narrow side surface of each of the Hall effect sensors is visible in the x-y plane shown, wherein the Hall effect sensors can be are implemented as Hall plates.

The illustration in FIG. 2 shows a cross-section along the axis of rotation 50 for the embodiment depicted in FIG. 1. In the present case, the axis of rotation 50 runs in the center of a shaft 60 implemented in a z direction. In the present case, the magnet 10 is located at an end of the shaft. In an imaginary extension, the longitudinal axis of the shaft or the axis of rotation 50 passes through the magnet 10. The semiconductor body 40 in the present case is arranged either below the magnet 10, i.e. along an imaginary extension of the axis of rotation 50 (solid line) or above the magnet 10 along the axis of rotation 50 (dashed line). In other words, the semiconductor body is spaced apart from the magnet 10 in the direction of the longitudinal axis, but the semiconductor body 40 is located within the area of an isometric projection along the z axis. An integrated circuit that is not shown is implemented at the surface of the semiconductor body 40. In addition, the semiconductor body 40 is located in an IC package.

As soon as the shaft with the magnet 10 rotates, a Hall voltage is induced in the Hall plates if an operating current is flowing through the Hall plates. The angle of rotation of the axis of rotation can be determined by means of an algorithm.

FIG. 3 shows an embodiment with a magnet 10 with a total of sixteen magnetic poles assembled into eight magnetic pole pairs. The north poles and south poles alternate a total of eight times along the main extension surface, which is to say the magnet is segmented. The areas of the segments are equal in size here. Each north pole has a south pole associated with it along the axis of rotation 50, which is to say that in the present case a pole reversal along the Z direction is implemented in addition to a so-called diametrical magnetization. The semiconductor body 40 (not shown) can be located above as well as below the magnet 10.

Figure 4:
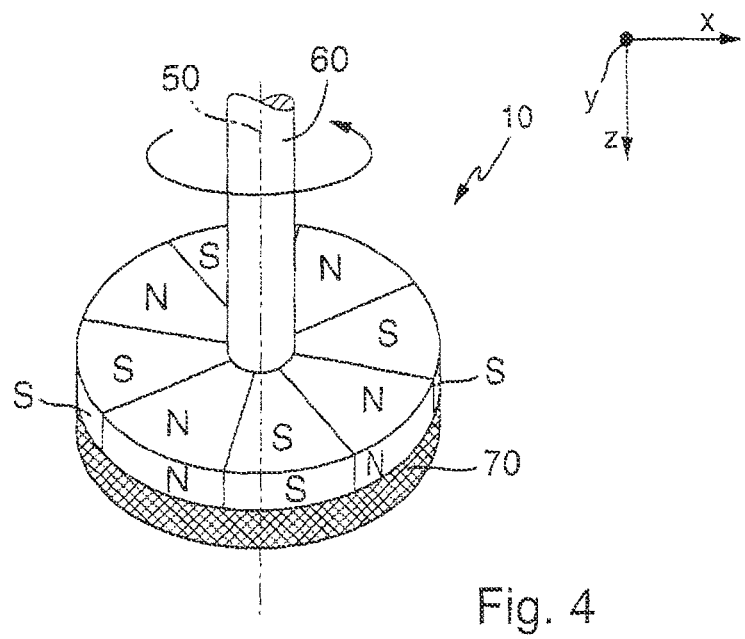
FIG. 4 shows an embodiment of the magnet with eight magnetic poles and a magnetic short circuit plate on one side.

FIG. 4 shows an embodiment of the magnet 10 with eight magnet poles and a magnetic short circuit plate 70 implemented on one side. In the present case, the magnet 10 is only diametrically magnetized. The short circuit plate 70 is located below the magnet 10 and has an essentially equal and preferably identical area to that of the magnet 10. A magnetic short circuit exists between the short circuit plate 70 and the underside of the magnet 10. As a result, the underside of the magnet 10 is nearly free of magnetic fields. The semiconductor body 40 can only be located above the magnet 10.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A magnetic field measuring device comprising:
   a semiconductor body with a surface parallel to an x-y plane, an x direction and a y direction being orthogonal to one another;
   a magnet with a flat main extension surface parallel to the x-y plane, a direction of magnetization changing along the main extension surface due to at least two adjacent magnetic poles, the magnet being rotatable relative to the semiconductor body about an axis of rotation extending in a z direction, the z direction being orthogonal to the x-y plane,
   wherein an imaginary extension of the axis of rotation passes through the main extension surface of the magnet at a centroid of the magnet,
   wherein the surface of the semiconductor body is spaced apart from the main extension surface of the magnet in the z direction,
   wherein the semiconductor body has three magnetic field sensors spaced apart from one another on the surface, each of the magnetic field sensors measuring a same direction of a same component of the magnetic field, a first magnetic field sensor and a third magnetic field sensor each having substantially the same spacing from a second magnetic field sensor, the three magnetic field sensors disposed along a first direction in the x-y plane,
   wherein, for a projection of the main extension surface along the imaginary extension of the axis of rotation or along the axis of rotation, all magnetic field sensors are located within the projected area,
   wherein the magnetic field sensors have a spacing from the imaginary extension of the axis of rotation or from the axis of rotation, and
   wherein the first magnetic field sensor and the third magnetic field sensor each have substantially the same spacing from the imaginary extension of the axis of rotation or from the axis of rotation.

2. The magnetic field measuring device according to claim 1, wherein the second magnetic field sensor has a smaller spacing or a greater spacing from the imaginary extension of the axis of rotation or from the axis of rotation than the first magnetic field sensor.

3. The magnetic field measuring device according to claim 1, wherein the three magnetic field sensors are arranged in a row, and wherein the second magnetic field sensor is located between the other two magnetic field sensors in the center of the row.

4. The magnetic field measuring device according to claim 1, wherein the semiconductor body has a quadrangular shape in the x-y plane, and wherein the three magnetic field sensors are arranged essentially along a secant of the projection of the main extension surface.

5. The magnetic field measuring device according to claim 1, wherein an integrated circuit is implemented in the surface of the semiconductor body, and wherein the integrated circuit stands in operative electrical connection with the three magnetic field sensors, and wherein the semiconductor body is integrated into an IC package.

6. The magnetic field measuring device according to claim 1, wherein the magnetic field sensors are provided on exactly three locations on the semiconductor body.

7. The magnetic field measuring device according to claim 1, wherein the magnetic field sensors are Hall plates.

8. The magnetic field measuring device according to claim 1, wherein the magnet has a circular and disk-shaped design.

9. The magnetic field measuring device according to claim 1, wherein the magnet has a total of eight magnetic poles along the main extension surface.

10. The magnetic field measuring device according to claim 1, wherein the poles of the magnet are short-circuited along a side opposite the main extension surface.

11. The magnetic field measuring device according to claim 1, wherein the magnet is implemented as a circle in the x-y plane, and wherein a radius of the circle is greater than the spacing between the first magnetic field sensor and the second magnetic field sensor.

12. The magnetic field measuring device according to claim 1, wherein the magnetic field measuring device detects an angle of rotation of the magnet that is attached to the axis of rotation or to a shaft.

13. The magnetic field measuring device according to claim 1, wherein the magnetic field measuring device determines an angle of rotation of the magnet that is attached to a stationary axis of rotation or to a shaft.

14. The magnetic field measuring device according to claim 1, wherein the magnetic field passes through the semiconductor body only in a single direction.

15. The magnetic field measuring device according to claim 10, wherein the magnetic field of the magnet emanates primarily from the main extension surface.

16. The magnetic field measuring device according to claim 1, wherein the main extension surface and a side opposite the main extension surface of the magnet are diametrically magnetized.

17. The magnetic field measuring device according to claim 1, wherein the magnet is a cylindrical magnet, wherein the first direction intersects the projection of the main extension surface as a secant.

18. A magnetic field measuring device comprising:
   a semiconductor body with a surface parallel to an x-y plane, an x direction and a y direction being orthogonal to one another;
   a magnet with a flat main extension surface parallel to the x-y plane, a direction of magnetization changing along the main extension surface due to at least two adjacent magnetic poles, the magnet being rotatable relative to the semiconductor body about an axis of rotation extending in a z direction, the z direction being orthogonal to the x-y plane, wherein an imaginary extension of the axis of rotation passes through the main extension surface of the magnet at a centroid of the magnet, wherein the surface of the semiconductor body is spaced apart from the main extension surface of the magnet in the z direction, wherein the semiconductor body has three magnetic field sensors spaced apart from one another on the surface, each of the magnetic field sensors measuring a same component of the magnetic field, a first magnetic field sensor and a third magnetic field sensor each having substantially the same spacing from a second magnetic field sensor, the three magnetic field sensors disposed in the x-y plane, wherein, for a projection of the main extension surface along the imaginary extension of the axis of rotation or along the axis of rotation, all magnetic field sensors are located within the projected area, wherein the magnetic field sensors have a spacing from the imaginary extension of the axis of rotation or from the axis of rotation, wherein the first magnetic field sensor and the third magnetic field sensor each have substantially the same spacing from the imaginary extension of the axis of rotation or from the axis of rotation, and wherein the three magnetic field sensors are arranged along a connecting line, and wherein the second magnetic field sensor is located between the other two magnetic field sensors centered on the connecting line.

* * * * *